(12) United States Patent
Peng et al.

(10) Patent No.: US 12,155,928 B2
(45) Date of Patent: Nov. 26, 2024

(54) PROJECTION SYSTEM AND METHOD FOR SELECTING IMAGE CAPTURING NUMBER FOR IMAGE BLENDING

(71) Applicant: Coretronic Corporation, Hsin-Chu (TW)

(72) Inventors: Chien-Chun Peng, Hsin-Chu (TW); Hsun-Cheng Tu, Hsin-Chu (TW); Chi-Wei Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 181 days.

(21) Appl. No.: 17/544,940

(22) Filed: Dec. 8, 2021

(65) Prior Publication Data

US 2022/0191391 A1 Jun. 16, 2022

(30) Foreign Application Priority Data

Dec. 11, 2020 (CN) .......................... 202011457078.8

(51) Int. Cl.
*H04N 23/60* (2023.01)
*G03B 37/04* (2021.01)
(Continued)

(52) U.S. Cl.
CPC ............. *H04N 23/64* (2023.01); *G03B 37/04* (2013.01); *G06F 18/251* (2023.01); *G06T 5/50* (2013.01);
(Continued)

(58) Field of Classification Search
CPC ...... H04N 23/64; H04N 23/60; H04N 23/667; H04N 23/80; H04N 23/90; H04N 23/698;
(Continued)

(56) References Cited

U.S. PATENT DOCUMENTS

2006/0187234 A1\* 8/2006 Deng ..................... G06F 3/1446
345/592
2011/0234920 A1\* 9/2011 Nelson ................. H04N 9/3194
348/E3.048
(Continued)

FOREIGN PATENT DOCUMENTS

| CN | 104469223 | 3/2015 |
| CN | 105376540 | 3/2016 |

(Continued)

OTHER PUBLICATIONS

"Office Action of China Counterpart Application", issued on Oct. 16, 2023, p. 1-p. 7.
(Continued)

*Primary Examiner* — Twyler L Haskins
*Assistant Examiner* — Akshay Trehan
(74) *Attorney, Agent, or Firm* — JCIPRNET

(57) ABSTRACT

A projection system and a method for selecting an image capturing number for image blending are provided. Multiple projection devices are driven one-by-one to project a pattern; multiple image capturing devices are driven to capture the pattern projected by each projection device, so as to obtain multiple image capturing results corresponding to the image capturing devices. Finally, at least one of the image capturing devices is selected to serve as an image capturing source for image blending based on the image capturing results. An image capturing range is identified through projected patterns, and an effective range is calculated and then selected for use, which is used for calculations required for automatic blending, so as to avoid a problem of being unable to maintain blending and merging due to environmental influences or failure of the image capturing device when performing image recognition and calculation required for automatic blending and merging.

16 Claims, 9 Drawing Sheets

(51) Int. Cl.
*G06F 18/25* (2023.01)
*G06T 5/50* (2006.01)
*G06T 7/70* (2017.01)
*G06V 10/145* (2022.01)
*H04N 9/31* (2006.01)
*H04N 23/667* (2023.01)
*H04N 23/80* (2023.01)
*H04N 23/90* (2023.01)

(52) U.S. Cl.
CPC .............. *G06T 7/70* (2017.01); *G06V 10/145* (2022.01); *H04N 9/3147* (2013.01); *H04N 9/3179* (2013.01); *H04N 9/3194* (2013.01); *H04N 23/60* (2023.01); *H04N 23/667* (2023.01); *H04N 23/80* (2023.01); *H04N 23/90* (2023.01); *G06T 2207/20221* (2013.01); *G06T 2207/30168* (2013.01)

(58) Field of Classification Search
CPC .. H04N 9/3147; H04N 9/3179; H04N 9/3194; G03B 37/04; G06F 18/251; G06T 5/50; G06T 7/70; G06T 2207/20221; G06T 2207/30168; G06V 10/145
See application file for complete search history.

(56) References Cited

U.S. PATENT DOCUMENTS

| | | | | |
|---|---|---|---|---|
| 2012/0314015 | A1* | 12/2012 | Watson | H04N 7/15 348/E7.083 |
| 2014/0104581 | A1* | 4/2014 | Yoshimura | G03B 21/26 353/30 |
| 2014/0104582 | A1* | 4/2014 | Mori | H04N 9/3182 353/30 |
| 2015/0292873 | A1* | 10/2015 | Chou | G06T 7/593 348/136 |
| 2016/0134849 | A1* | 5/2016 | Wang | H04N 9/3185 348/744 |
| 2016/0142644 | A1* | 5/2016 | Lin | G06V 10/757 348/143 |
| 2017/0324900 | A1* | 11/2017 | Lin | H04N 23/698 |
| 2018/0139422 | A1* | 5/2018 | Moule | G06T 5/70 |
| 2019/0104290 | A1* | 4/2019 | Lin | H04N 9/3182 |
| 2019/0289223 | A1* | 9/2019 | Abbas | H04N 7/181 |

FOREIGN PATENT DOCUMENTS

| | | |
|---|---|---|
| CN | 106060493 | 10/2016 |
| CN | 106131454 | 11/2016 |
| CN | 107360346 | 11/2017 |
| CN | 109587457 | 4/2019 |
| JP | 2020061688 | 4/2020 |
| TW | 201538929 | 10/2015 |
| TW | 201617719 | 5/2016 |
| TW | 202027494 | 7/2020 |
| TW | 202034684 | 9/2020 |

OTHER PUBLICATIONS

Fan Yan, "Research and Application on Image Stitching", Master's thesis of Xiangtan University, with English abstract, May 20, 2016, pp. 1-70.

Kyu-Yul Lee et al., "Robust Video Stitching Using Adaptive Pixel Transfer", 2015 IEEE International Conference on Image Processing (ICIP), Dec. 10, 2015, pp. 813-817.

"Notice of allowance of China Counterpart Application", issued on May 20, 2024, p. 1-p. 4.

* cited by examiner

PROJECTION SYSTEM AND METHOD FOR SELECTING IMAGE CAPTURING NUMBER FOR IMAGE BLENDING

CROSS-REFERENCE TO RELATED APPLICATION

This application claims the priority benefit of China Application No. 202011457078.8, filed on Dec. 11, 2020. The entirety of the above-mentioned patent application is hereby incorporated by reference herein and made a part of this specification.

BACKGROUND

Technical Field

The invention relates to a projection system and a method, and particularly relates to a projection system and a method for selecting an image capturing number for image blending.

Description of Related Art

Projection blending is to integrate a plurality of projectors to merge a projection image into a display area such as an extending wall surface, a ring-like, arc, irregular wall surface, etc. Selection of the projectors is most important, since without an edge blender, there is a problem of image overlap where projection ranges of two projectors are intersected, resulting in increased brightness and blurred signals in the overlapped area. Edge blending technology is to perform edge overlap on images projected by a group of projectors, and display a seamless, brighter, integral image with higher-resolution by using the blending technology, so that the projection image may have image quality like that of an image projected by one projector. In order to realize automatic blending, cameras are used to photograph the projection image, so as to use the projection image to perform image recognition and calculation required for automatic image blending.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a projection system and a method for selecting an image capturing number for image blending, which avoid a problem of being unable to maintain blending and merging due to environmental influences or failure of an image capturing device when performing image recognition and calculation required for automatic blending.

The invention provides a projection system including a plurality of projection devices, a plurality of image capturing devices, and a processor. The processor is coupled to the projection devices and the image capturing devices. The processor is configured to drive the projection devices one-by-one to project a pattern, drive the image capturing devices to capture the pattern projected by each of the projection devices, so as to obtain a plurality of image capturing results corresponding to the image capturing devices, and select at least one of the image capturing devices to serve as an image capturing source for image blending based on the image capturing results.

The invention provides a method for selecting an image capturing number for image blending, which includes following steps: driving a plurality of projection devices one-by-one to project a pattern; driving a plurality of image capturing devices to capture the pattern projected by each of the projection devices, so as to obtain a plurality of image capturing results corresponding to the image capturing devices; and selecting at least one of the image capturing devices to serve as an image capturing source for image blending based on the image capturing results.

Based on the above description, according to the invention, the number of images obtained by the image capturing devices by capturing the projected patterns is reduced, so as to improve a speed of an image capturing process, and avoid the problem of being unable to maintain blending due to environmental influences or failure of the image capturing devices when performing image recognition and calculation required for automatic blending.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
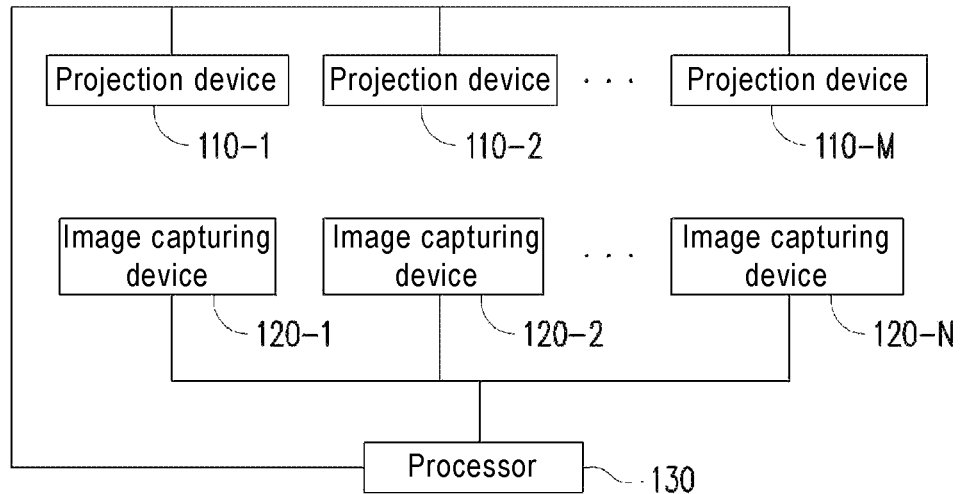
FIG. 1 is a block diagram of a projection system according to an embodiment of the invention.

FIG. 1 is a block diagram of a projection system according to an embodiment of the invention. Referring to FIG. 1, the projection system of the embodiment includes M projection devices 110-1 to 110-M, N image capturing devices 120-1 to 120-N, and a processor 130. Here, a number of the projection devices and a number of the image capturing devices are not limited, as long as there are at least two projection devices and at least two image capturing devices, and the number of the projection devices M and the number of the image capturing devices N may be the same or different.

In terms of setting, the image capturing devices 120-1 to 120-N may be respectively installed on each of the projection devices 110-1 to 110-M. For example, one projection device is provided with one image capturing device. The processor 130 is, for example, installed in an independent electronic device, and is coupled to the projection devices 110-1 to 110-M and the image capturing devices 120-1 to 120-N through a wired or wireless manner, so as to drive the projection devices 110-1 to 110-M and the image capturing devices 120-1 to 120-N to operate, and adjust parameters of the projection devices 110-1 to 110-M after performing image recognition and analysis.

The processor 130 is, for example, a central processing unit (CPU), a graphic processing unit (GPU), a physics processing unit (PPU), a programmable microprocessor, an embedded type control chip, digital signal processor (DSP), application specific integrated circuits (ASIC) or other similar devices. In an embodiment, the processor 130 may be an image blending processing device. The electronic device also includes a storage device, which may be implemented by any type of a fixed or removable random access memory, a read-only memory, a flash memory, a secure digital card, a hard drive or other similar devices or a combination of these devices. One or a plurality of program instructions are stored in the storage device, and the processor 130 executes the program instructions to implement a following method for selecting an image capturing number for image blending.

Figure 2:
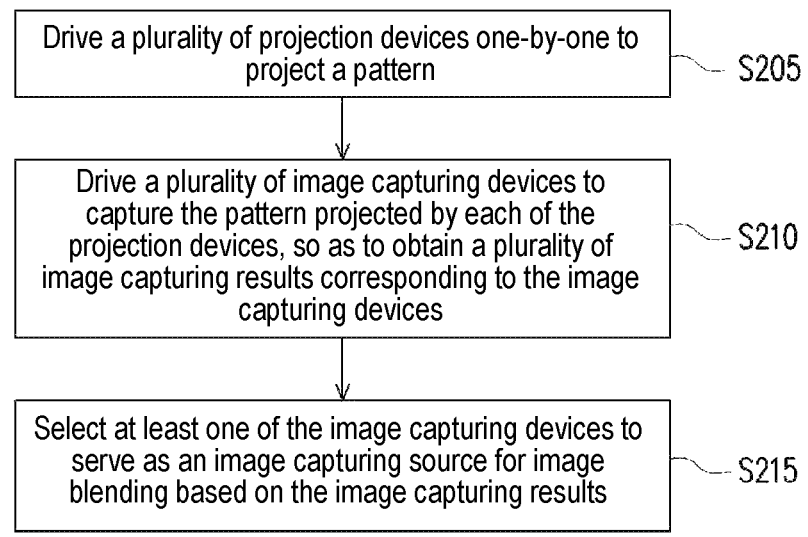
FIG. 2 is a flowchart illustrating a method for selecting an image capturing number for image blending.

FIG. 2 is a flowchart illustrating a method for selecting an image capturing number for image blending. Referring to FIG. 1 and FIG. 2, in step S205, the processor 130 drives the projection devices 110-1 to 110-M one-by-one to project a pattern. The pattern, for example, has a plurality of grid points on left and right sides.

In addition, in step S210, the processor 130 drives the image capturing devices 120-1 to 120-N to capture the patterns projected by each of the projection devices 110-1 to 110-M, so as to obtain a plurality of image capturing results corresponding to each of the image capturing devices 120-1 to 120-N. Here, after one of the projection devices projects a pattern, the processor 130 may drive the image capturing devices 120-1 to 120-N to respectively or simultaneously photograph the projected pattern.

In step S215, the processor 130 selects at least one of the image capturing devices 120-1 to 120-N to serve as an image capturing source for image blending based on the image capturing results. The processor 130 may identify a grid point number of the grid points included in each image capturing result and a grid point position of each grid point, and select at least one of the image capturing devices 120-1 to 120-N to serve as the image capturing source for image blending based on the grid point number and the grid point positions. A photographing range of the selected image capturing device covers the most grid points.

Since when all of the projection devices 110-1 to 110-N project patterns, a problem of pattern overlap occurs, the processor 130 drives one projection device to project a pattern at a time, and each time when a pattern is projected, at least one image capturing device is used to capture an image. Another example is provided below to describe an image capturing sequence. It should be noted that a sequence that the projection device projects the patterns may be determined by the processor 130 or set by a user, which is not necessarily a setting sequence of the projection devices.

Figure 3:
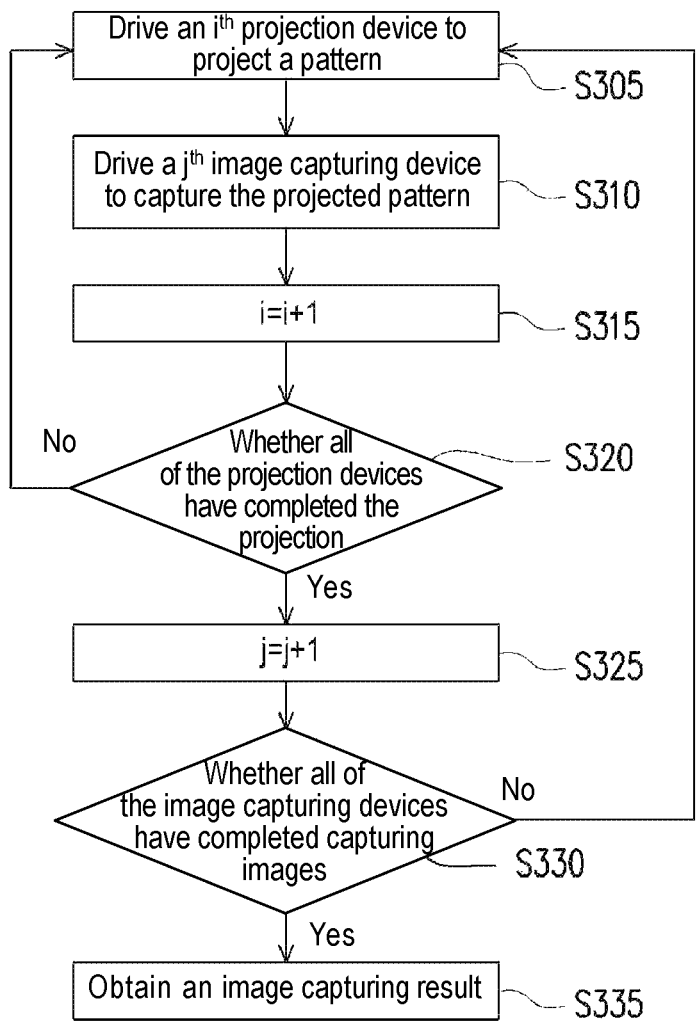
FIG. 3 is a flowchart illustrating a method for obtaining an image capturing result according to an embodiment of the invention.

FIG. 3 is a flowchart illustrating a method for obtaining an image capturing result according to an embodiment of the invention. Referring to FIG. 3, in step S305, an $i^{th}$ projection device is driven to project a pattern, where an initial value of i is 1. Then, in step S310, a $j^{th}$ image capturing device is driven to capture the projected pattern, where an initial value of j is 1. In addition, in step S315, i=i+1, so as to subsequently drive a next projection device to project a pattern. Then, in step S320, it is determined whether all of the projection devices have completed projections. For example, when M projection devices are provided, it is determined whether i is greater than M. If there are still projection devices that have not completed projections (i is not greater than M), the flow returns to step S305; and if all of the projection devices have completed projections (i is greater than M), in step S325, j=j+1, so as to subsequently drive a next image capturing device to capture the projected pattern.

Then, in step S330, it is determined whether all of the image capturing devices have completed image capturing. For example, when N image capturing devices are provided, it is determined whether j is greater than N. If there are still image capturing devices that have not completed image capturing (j is not greater than M), the flow returns to step S305. If all of the image capturing devices have completed image capturing (j is greater than M), in step S335, an image capturing result is obtained.

For example, the processor 130 drives the projection device 110-1 to project a pattern, and drives the image capturing device 120-1 to perform image capturing. Then, the processor 130 drives the projection device 110-2 to project a pattern, and drives the image capturing device 120-1 to perform image capturing. Deduced by analogy, the projection device 110-M is driven to project a pattern, and the image capturing device 120-1 is driven to perform image capturing. Namely, the image capturing device 120-1 respectively performs image capturing on the patterns projected by the projection devices 110-1 to 110-M. Thereafter, the projection devices 110-1 to 110-M are re-driven to project patterns, and the image capturing device 120-2 respectively performs image capturing on the patterns projected by the projection devices 110-1 to 110-M. Deduced by analogy, until the image capturing device 120-N respectively performs image capturing on the patterns projected by the projection devices 110-1 to 110-M.

In other embodiments, it is also possible to drive all of the image capturing devices 120-1 to 120-N to perform image capturing at the same time each time after a pattern is projected by one projection device. In another embodiment, a sequence that the projection devices project patterns and the image capturing devices perform image capturing may be designed differently according to actual conditions. For example, a part of the projection devices may be driven to project patterns, and a part of the image capturing devices are driven to perform image capturing, and then another part of the projection devices are driven to project patterns, and another part of the image capturing devices are driven to perform image capturing.

FIG. 4A to FIG. 4I are schematic diagrams of image capturing results according to an embodiment of the invention. In the embodiment, three projection devices 110-1 to 110-3 and three image capturing devices 120-1 to 120-3 are taken as examples for description, and four grid points are set at four corners to serve as a projected pattern, but the projected pattern is not limited to this. Based on positions where the projection devices 110-1 to 110-3 are installed, projection images (411-413, 421-423, 431-433, 441-443, 451-453, 461-463, 471-473, 481-483, 491-493) projected by the projection devices 110-1 to 110-3 may have overlapped portions (shown by shaded blocks in FIG. 4A-FIG. 4I). Accordingly, in case that all of the projection devices project patterns, the problem of pattern overlap occurs.

Therefore, in the embodiment, a following configuration is set: the processor 130 drives one projection device at a time to project a pattern, and a projection sequence thereof is, for example, the projection device 110-1, the projection device 110-2, the projection device 110-3, and one image capturing device is used to perform image capturing each time when the projection is performed. Each of the image capturing devices 120-1 to 120-3 may respectively perform image capturing on the patterns projected by the projection devices 110-1 to 110-3 to obtain image capturing results A1-A9. Therefore, in terms of three projection devices and three image capturing devices, 9 (3×3) image capturing results are finally obtained.

Figure 4A:
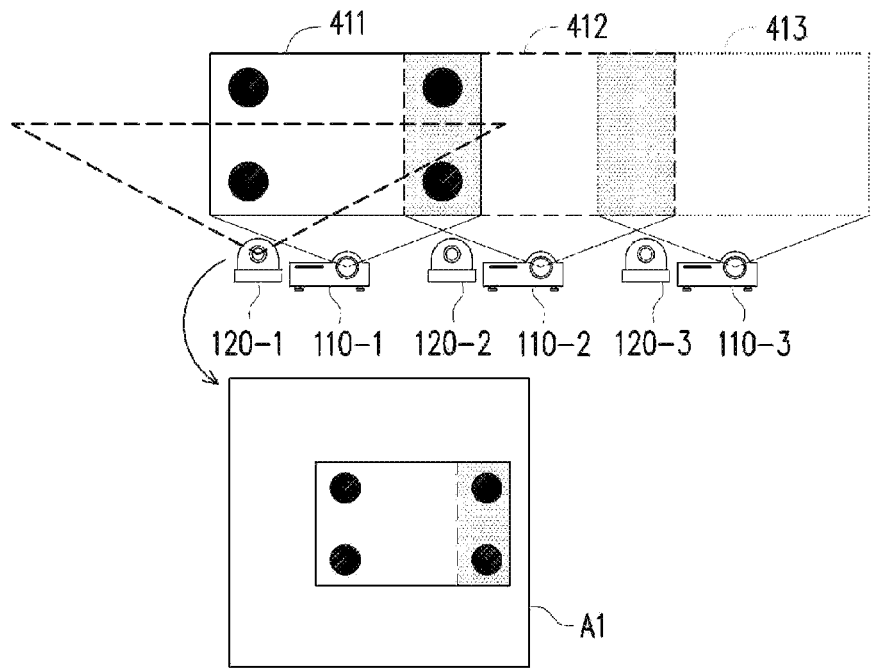
FIG. 4A to FIG. 4I are schematic diagrams of image capturing results according to an embodiment of the invention.
Figure 4B:
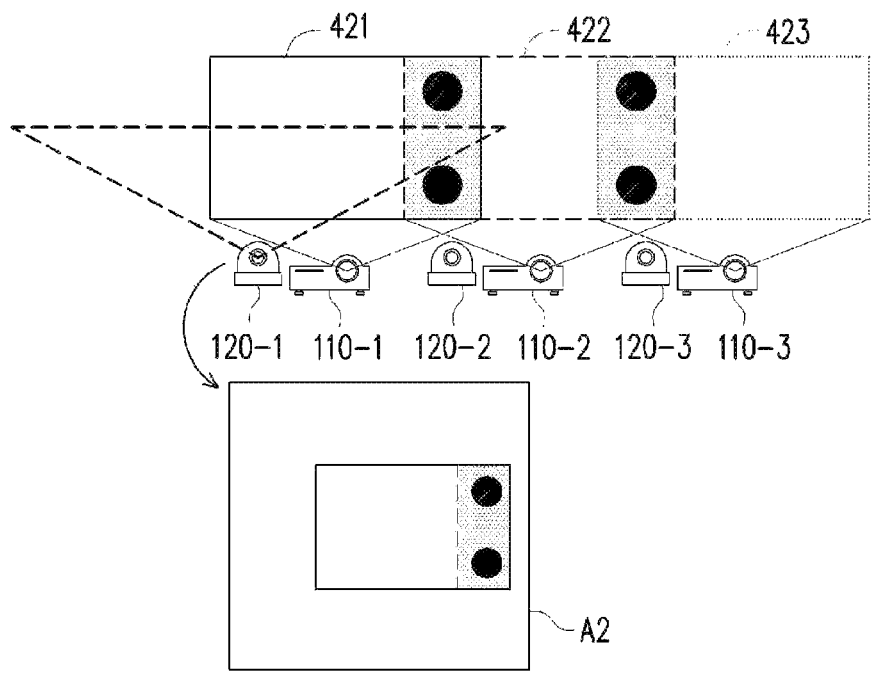
Figure 4C:
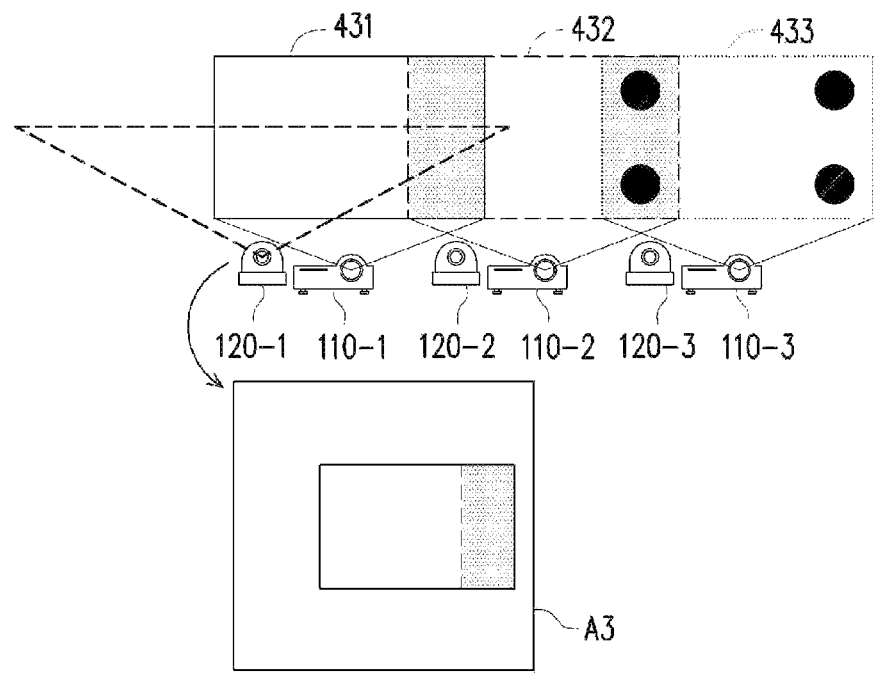

First, referring to FIG. 4A-FIG. 4C, the processor 130 drives the image capturing device 120-1 to respectively perform image capturing on the patterns projected by the projection devices 110-1 to 110-3. Then, referring to FIG. 4D to FIG. 4F, the image capturing device 120-2 is driven to respectively perform image capturing on the patterns projected by the projection devices 110-1 to 110-3. Thereafter, referring to FIG. 4G to FIG. 4I, the image capturing device 120-3 is driven to respectively perform image capturing on the patterns projected by the projection devices 110-1 to 110-3.

In FIG. 4A, the processor 130 drives the projection device 110-1 to project a pattern, so as to obtain a projection image 411. At this time, since the projection devices 110-2 and 110-3 do not project patterns, corresponding projection images 412 and 413 thereof are blank. In addition, the processor 130 drives the image capturing device 120-1 to perform image capturing to obtain an image capturing result A1. In FIG. 4B, the processor 130 drives the projection device 110-2 to project a pattern, so as to obtain a projection image 422. At this time, since the projection devices 110-1 and 110-3 do not project patterns, corresponding projection images 421 and 423 thereof are blank. In addition, the processor 130 drives the image capturing device 120-1 to perform image capturing to obtain an image capturing result A2. In FIG. 4C, the processor 130 drives the projection device 110-3 to project a pattern, so as to obtain a projection image 433. At this time, since the projection devices 110-1 and 110-2 do not project patterns, corresponding projection images 431 and 432 thereof are blank. In addition, the processor 130 drives the image capturing device 120-1 to perform image capturing to obtain an image capturing result A3.

Figure 4D:
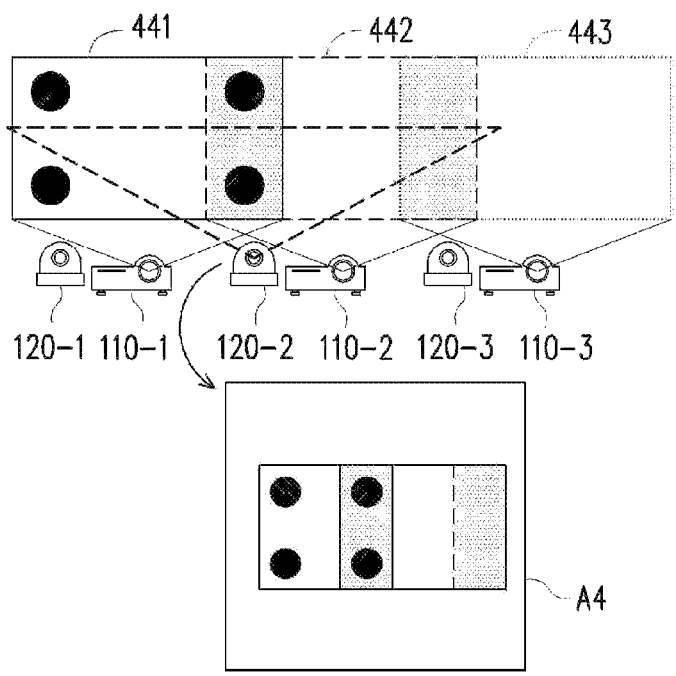
Figure 4E:
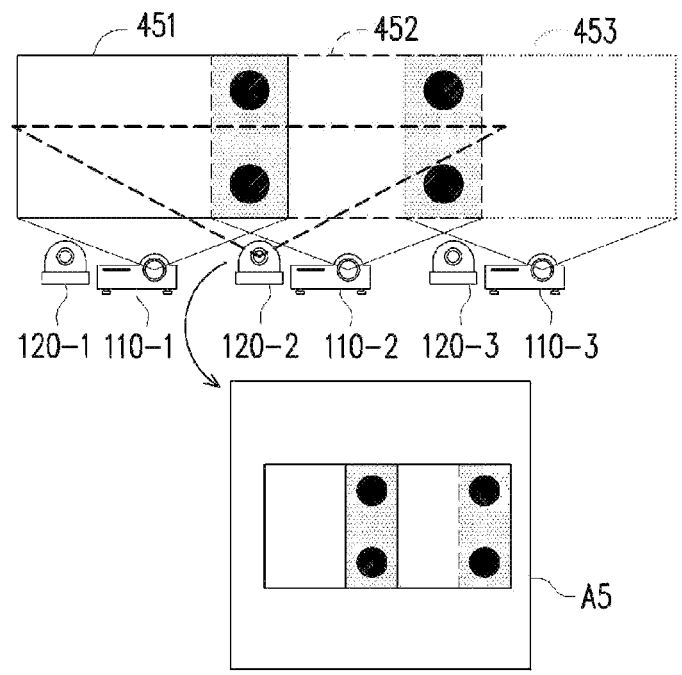
Figure 4F:
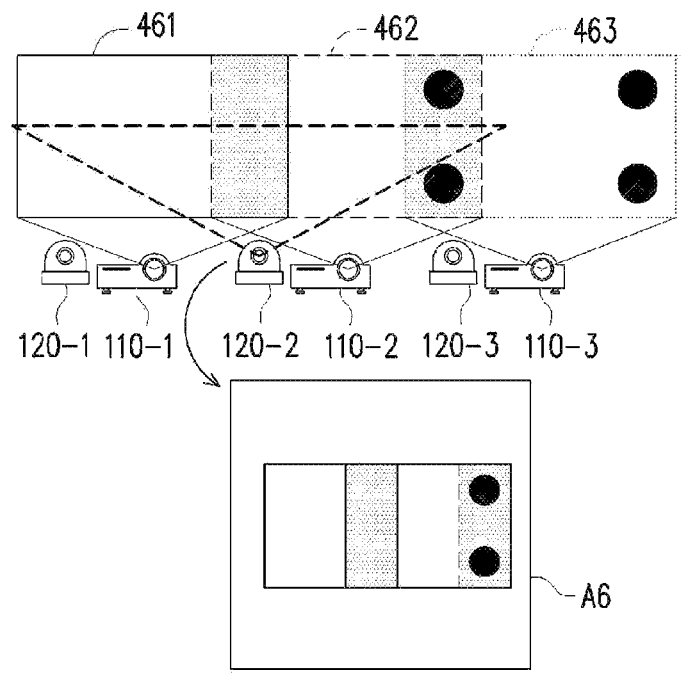

In FIG. 4D, the processor 130 drives the projection device 110-1 to project a pattern, so as to obtain a projection image 441. At this time, since the projection devices 110-2 and 110-3 do not project patterns, corresponding projection images 442 and 443 thereof are blank. In addition, the processor 130 drives the image capturing device 120-2 to perform image capturing to obtain an image capturing result A4. In FIG. 4E, the processor 130 drives the projection device 110-2 to project a pattern, so as to obtain a projection image 452. At this time, since the projection devices 110-1 and 110-3 do not project patterns, corresponding projection images 451 and 453 thereof are blank. In addition, the processor 130 drives the image capturing device 120-2 to perform image capturing to obtain an image capturing result A5. In FIG. 4F, the processor 130 drives the projection device 110-3 to project a pattern, so as to obtain a projection image 463. At this time, since the projection devices 110-1 and 110-2 do not project patterns, corresponding projection images 461 and 462 thereof are blank. In addition, the processor 130 drives the image capturing device 120-2 to perform image capturing to obtain an image capturing result A6.

Figure 4G:
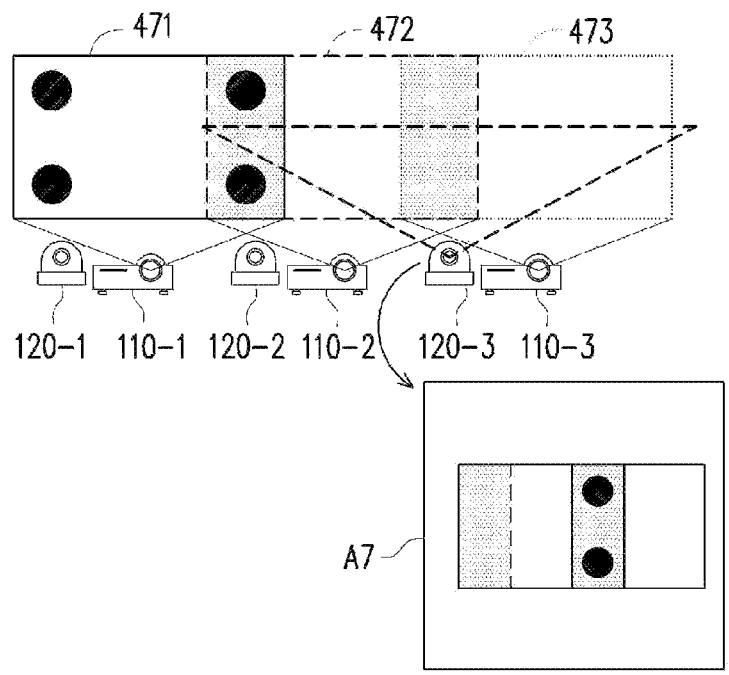
Figure 4H:
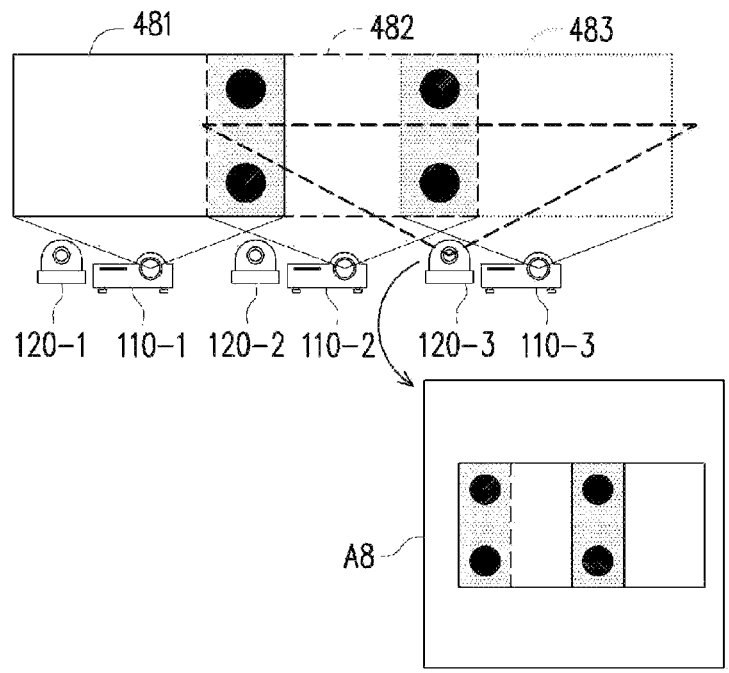
Figure 4I:
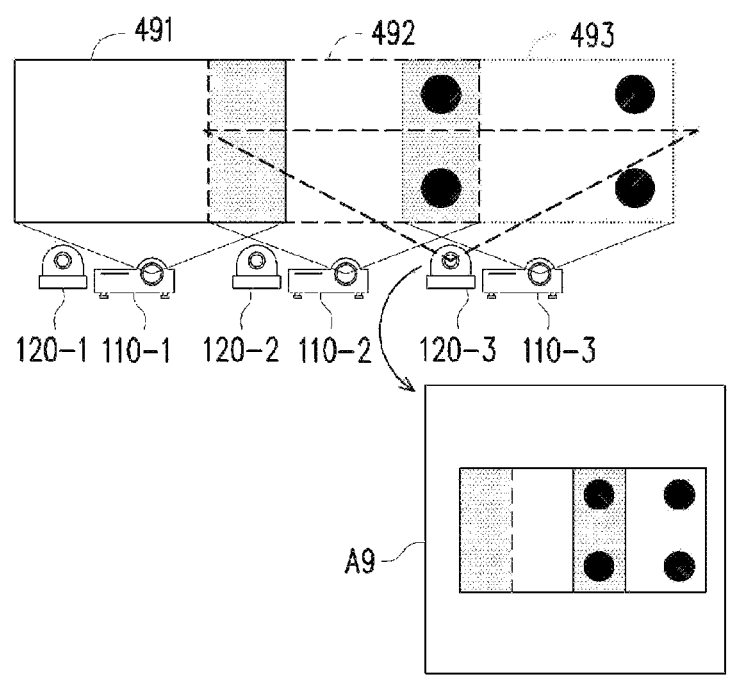

In FIG. 4G, the processor 130 drives the projection device 110-1 to project a pattern, so as to obtain a projection image 471. At this time, since the projection devices 110-2 and 110-3 do not project patterns, corresponding projection images 472 and 473 thereof are blank. In addition, the processor 130 drives the image capturing device 120-3 to perform image capturing to obtain an image capturing result A7. In FIG. 4H, the processor 130 drives the projection device 110-2 to project a pattern, so as to obtain a projection image 482. At this time, since the projection devices 110-1 and 110-3 do not project patterns, corresponding projection images 481 and 483 thereof are blank. In addition, the processor 130 drives the image capturing device 120-3 to perform image capturing to obtain an image capturing result A8. In FIG. 4I, the processor 130 drives the projection device 110-3 to project a pattern, so as to obtain a projection image 493. At this time, since the projection devices 110-1 and 110-2 do not project patterns, corresponding projection images 491 and 492 thereof are blank. In addition, the processor 130 drives the image capturing device 120-3 to perform image capturing to obtain an image capturing result A9.

After obtaining the image capturing results A1-A9, the processor 130 identifies the grid point numbers of the grid points included in the image capturing results A1-A9 and the grid point positions of the grid points based on the image capturing results A1-A9. Furthermore, the processor 130 determines projection ranges of the projection devices covered by the photographing range of each of the image capturing devices 120-1 to 120-3 based on the grid point positions in the image capturing results A1-A9. In this way, the grid point numbers and the projection ranges covered by the photographing range of each of the image capturing device 120-1 to 120-3 are listed in Table 1.

TABLE 1

| Image capturing device | Image capturing result | Grid point number | Covered projection ranges | | Covered grid point number |
|---|---|---|---|---|---|
| 120-1 | A1 | 4 | Projection device 110-1 | All | 6 |
|  | A2 | 2 | Projection device 110-2 | Partial |  |
|  | A3 | 0 | Projection device 110-3 | None |  |
| 120-2 | A4 | 4 | Projection device 110-1 | All |  |
|  | A5 | 4 | Projection device 110-2 | All | 10 |
|  | A6 | 2 | Projection device 110-3 | Partial |  |
| 120-3 | A7 | 2 | Projection device 110-1 | Partial |  |
|  | A8 | 4 | Projection device 110-2 | All | 10 |
|  | A9 | 4 | Projection device 110-3 | All |  |

Referring to Table 1, the grid point numbers and the projection ranges covered by the photographing ranges of the image capturing devices 120-1, 120-2, 120-3 may be identified based on the image capturing results A1-A3, the image capturing results A4-A6, and the image capturing results A7-A9.

Based on the above description, the processor 130 selects the image capturing sources for image blending from the image capturing devices 120-1 to 120-3 based on the grid point number and the grid point positions of the grid points covered by the photographing range of each of the image capturing devices 120-1 to 120-3. In addition, other unselected image capturing devices are used as backup image capturing sources.

For example, regarding the patterns (including 4 grid points) projected in FIG. 4A to FIG. 4I, if the grid point number of the grid points covered by one of the image capturing devices is equal to 12, it represents that each image capturing result corresponding to the three projection devices 110-1 to 110-3 has 4 grid points, so that only the one image capturing device may be used as the image capturing source.

If there is no image capturing device with the grid point number of the covered grid points being equal to 12, the image capturing device with the largest grid point number of the covered grid points is selected as the image capturing source, and it is confirmed that the photographing range of the image capturing source may cover the projection ranges of all of the projection devices. If the photographing range of the image capturing source does not cover the projection ranges of all of the projection devices, the image capturing device with the second largest grid point number of the covered grid points is further selected as the image capturing source. Taking the embodiment shown in FIG. 4A to FIG. 4I as an example (with reference of Table 1), the image capturing devices 120-2 and 120-3 (which cover the largest grid point number of the grid points) are selected as the image capturing sources, and the photographing ranges of the image capturing devices 120-2 and 120-3 may cover the projection ranges of all of the projection devices 110-1 to 110-3.

In addition, the processor 130 may also determine the image capturing source for image blending based on the grid point number, the grid point positions, and the image capturing quality included in each image capturing result. For example, it is assumed that the image capturing devices with the largest grid point number of the grid points that are found based on the image capturing results are A, B, and C, and the photographing ranges of the image capturing devices A and B cover the projection ranges of all of the projection devices, and the photographing ranges of the image capturing devices A and C also cover the projection ranges of all of the projection devices, the image capturing sources may be determined as the image capturing devices A and B or the image capturing devices A and C according to the image capturing quality of the image capturing devices B and C.

In addition, when the processor 130 determines that at least one image capturing device serving as the image capturing source is abnormal in image capturing, the image capturing device determined to be abnormal in image capturing is disabled, and at least one image capturing device is selected from other unselected image capturing devices to update the image capturing source. The image capturing device that may cover the projection ranges of all of the projection devices is selected with preference, so that the photographing range of the updated image capturing source may cover the projection ranges of all of the projection devices.

Figure 5A:
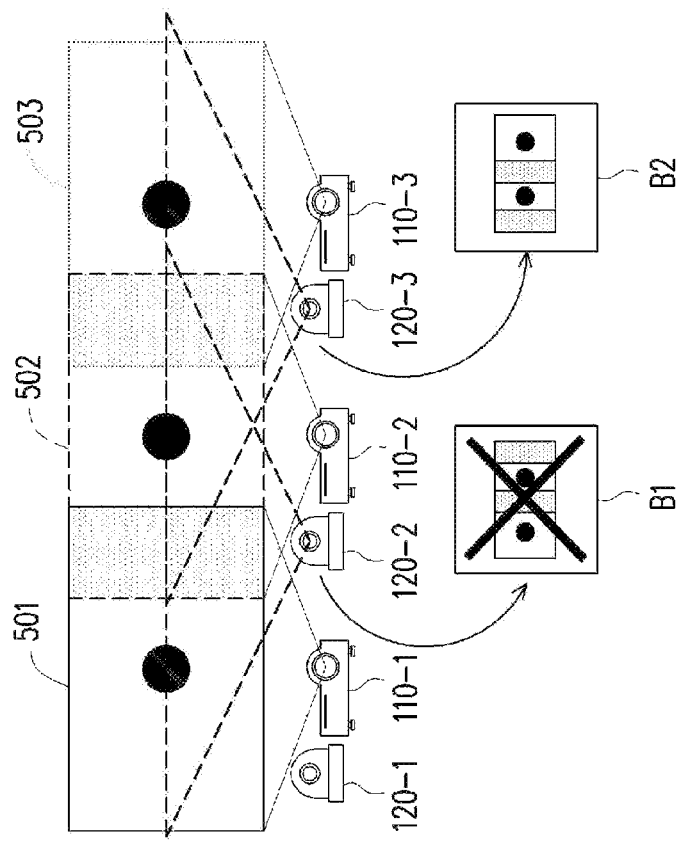
FIG. 5A and FIG. 5B are schematic diagrams of activating a backup device according to an embodiment of the invention.
Figure 5B:
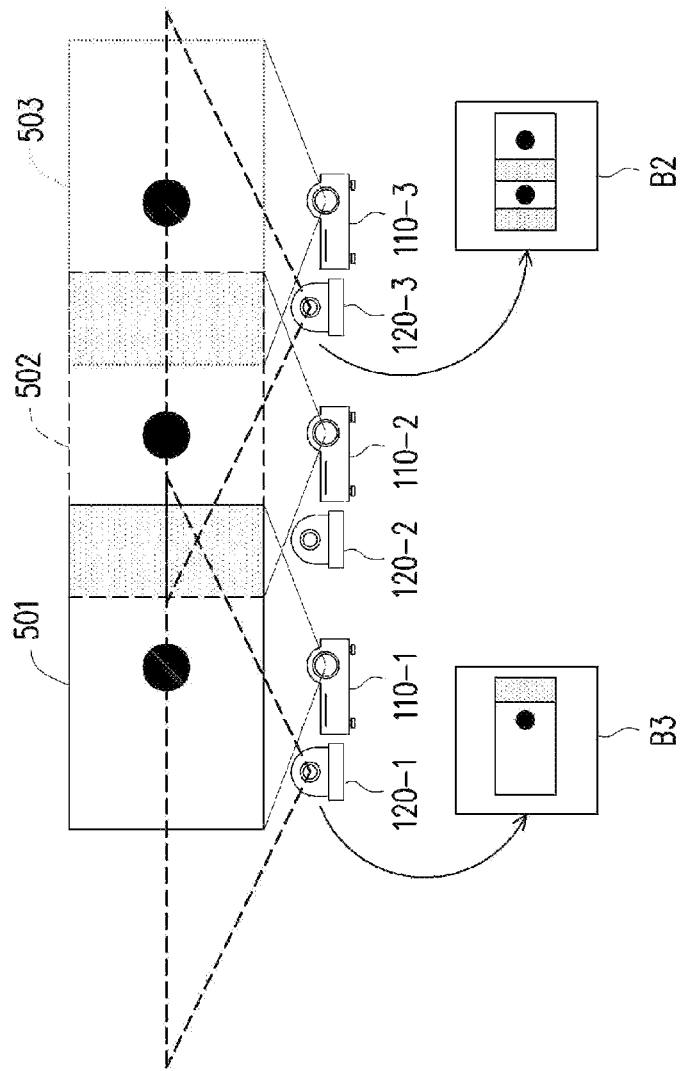

FIG. 5A and FIG. 5B are schematic diagrams of activating a backup device according to an embodiment of the invention. In the embodiment, three projection devices 110-1 to 110-3 and three image capturing devices 120-1 to 120-3 are taken as an example for description. The projection devices 110-1 to 110-3 respectively project patterns to obtain projection images 501-503. It is assumed that the image capturing devices 120-2 and 120-3 are used as main image capturing sources, and the image capturing device 120-1 is not activated. The image capturing devices 120-2 and 120-3 respectively obtain image capturing results B1 and B2. When it is determined that the image capturing device 120-2 is abnormal in image capturing, the image capturing device 120-1 is activated to obtain an image capturing result B3 through the image capturing device 120-1.

In addition, when it is determined that the photographing range of the updated image capturing source cannot cover the projection ranges of all of the projection devices, the processor 130 may further issue a warning notice. For example, the warning notice is a sound signal, a text signal, an image signal, or a flashing light signal, etc. Accordingly, the user is notified to send the projection system for repair.

In summary, the invention uses fully automated software and algorithms to automatically set effective ranges of the image capturing devices for capturing images, so as to define whether there is a phenomenon of image overlap. In the above embodiments, the image capturing range is identified through projected patterns, and the effective ranges are calculated and then selected with preference for usage, which may be used for calculations required for automatic blending. In this way, the number of images obtained by the image capturing devices by capturing the projected patterns is reduced, so as to improve a speed of the image capturing process, and avoid a problem of being unable to maintain blending and merging due to environmental influences or failure of the image capturing device when performing image recognition and calculation required for automatic blending and merging.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection system, comprising: a plurality of projection devices, a plurality of image capturing devices, and a processor, wherein:
   each of the plurality of projection devices has a projection range, each of the plurality of image capturing devices has a photographing range, the processor is coupled to the projection devices and the image capturing devices, the processor is configured to drive the projection devices one-by-one to project a pattern on the corresponding projection range, drive the image capturing devices to capture the corresponding photographing range, so as to obtain a plurality of image capturing results corresponding to the image capturing devices, the processor is configured to select at least one of the image capturing devices to serve as at least one image capturing source device based on the image capturing results, and only drive the at least one image capturing source device to capture the corresponding photographing ranges for image blending, wherein a number of the plurality of image capturing devices is m, a number of the at least one image capturing source device is n, wherein n equals to or less than m−1.

2. The projection system as claimed in claim 1, wherein the processor is configured to drive the image capturing devices to capture the photographing ranges respectively or simultaneously after one of the projection devices projects the pattern.

3. The projection system as claimed in claim 1, wherein the pattern comprises a plurality of grid point; and the processor is configured to identify a grid point number and a grid point position comprised in each of the image capturing results, and select at least one of the image capturing devices to serve as the at least one image capturing source device based on the grid point number and the grid point position, wherein the image capturing result corresponding to each of the at least one image capturing source device is that the grid number covered by the photographing range of each of the at least one image capturing source device is largest.

4. The projection system as claimed in claim 3, wherein the processor is configured to select the at least one of the image capturing devices to serve as the at least one image capturing source device based on the grid point number and the grid point position comprised in each of the image capturing results and on image capturing quality.

5. The projection system as claimed in claim 1, wherein when determining that one of the at least one image capturing source device is abnormal in image capturing, the processor is configured to disable the one of the at least one image capturing source device determined to be abnormal in image capturing, and select one of the unselected image capturing devices to serve as one of the at least one image capturing source device.

6. The projection system as claimed in claim 5, wherein the processor is configured to issue a warning notice when determining that a photographing range of one of the at least one image capturing source device is unable to cover projection ranges of all of the projection devices.

7. The projection system as claimed in claim 1, wherein a number of the projection devices is at least two, a number of the image capturing devices is at least two, and the number of the projection devices and the number of the image capturing devices are the same or different.

8. The projection system as claimed in claim 1, wherein one of the image capturing devices is disposed on one of the projection devices.

9. A method for selecting an image capturing number for image blending, the method comprising:
   driving a plurality of projection devices one-by-one to project a pattern on a projection range of the corresponding projection device;
   driving a plurality of image capturing devices to capture a photographing range of the corresponding image capturing device, so as to obtain a plurality of image capturing results corresponding to the image capturing devices; and
   selecting at least one of the image capturing devices to serve as at least one image capturing source device based on the image capturing results, and only driving the at least one image capturing source device to capture the corresponding photographing ranges for image blending, wherein a number of the plurality of image capturing devices is m, a number of the at least one image capturing source device is n, wherein n equals to or less than m−1.

10. The method for selecting the image capturing number for image blending as claimed in claim 9, wherein driving the image capturing devices to capture the photographing range of the corresponding image capturing device comprises:

driving the image capturing devices to capture the photographing ranges respectively or simultaneously after one of the projection devices projects the pattern.

11. The method for selecting the image capturing number for image blending as claimed in claim 9, wherein the pattern comprises a plurality of grid point, and selecting the at least one of the image capturing devices to serve as the at least one image capturing source device based on the image capturing results comprises:

identifying a grid point number and a grid point position comprised in each of the image capturing results; and selecting the at least one of the image capturing devices to serve as the at least one image capturing source device based on the grid point number and the grid point position, wherein the image capturing result corresponding to each of the at least one image capturing source device is that the grid number covered by the photographing range of each of the at least one image capturing source device is largest.

12. The method for selecting the image capturing number for image blending as claimed in claim 11, wherein selecting the at least one of the image capturing devices to serve as the at least one image capturing source device based on the image capturing results further comprises:

selecting the at least one of the image capturing devices to serve as the at least one image capturing source device based on the grid point number and the grid point position comprised in each of the image capturing results and on image capturing quality.

13. The method for selecting the image capturing number for image blending as claimed in claim 9, the method further comprising:

when determining that one of the at least one image capturing source device is abnormal in image capturing, disabling the one of the at least one image capturing source device determined to be abnormal in image capturing, and selecting one of the unselected image capturing devices to serve as one of the at least one image capturing source device.

14. The method for selecting the image capturing number for image blending as claimed in claim 13, further comprising:

issuing a warning notice when determining that a photographing range of one of the at least one image capturing source device is unable to cover projection ranges of all of the projection devices.

15. The method for selecting the image capturing number for image blending as claimed in claim 9, wherein a number of the projection devices is at least two, a number of the image capturing devices is at least two, and the number of the projection devices and the number of the image capturing devices are the same or different.

16. The method for selecting the image capturing number for image blending as claimed in claim 9, wherein one of the image capturing devices is disposed on one of the projection devices.

* * * * *